United States Patent
Fennel et al.

(10) Patent No.: US 6,616,250 B1
(45) Date of Patent: Sep. 9, 2003

(54) METHOD OF CONTROLLING THE PERFORMANCE OF A MOTOR VEHICLE

(75) Inventors: Helmut Fennel, Bad Soden (DE); Ivica Batistic, Frankfurt am Main (DE)

(73) Assignee: Continental Teves, AG & Co.oHG, Frankfurt (DE)

(*) Notice: Subject to any disclaimer, the term of this patent is extended or adjusted under 35 U.S.C. 154(b) by 0 days.

(21) Appl. No.: 09/913,393

(22) PCT Filed: Feb. 22, 2000

(86) PCT No.: PCT/EP00/01445
§ 371 (c)(1),
(2), (4) Date: Jan. 9, 2002

(87) PCT Pub. No.: WO00/51861
PCT Pub. Date: Sep. 8, 2000

(30) Foreign Application Priority Data

Feb. 27, 1999 (DE) .......................... 199 08 546
Sep. 15, 1999 (DE) .......................... 199 44 091
Feb. 11, 2000 (DE) .......................... 100 06 012

(51) Int. Cl.$^7$ ................................. B60T 8/24
(52) U.S. Cl. ........................................... 303/139
(58) Field of Search .............................. 303/139, 141, 303/150, 160, DIG. 7

(56) References Cited

U.S. PATENT DOCUMENTS

| | | | | |
|---|---|---|---|---|
| 5,696,681 A | * | 12/1997 | Hrovat et al. ............ | 701/70 |
| 6,223,108 B1 | * | 4/2001 | Izawa et al. ............. | 701/36 |
| 6,330,496 B1 | * | 12/2001 | Latarnik et al. ......... | 701/1 |
| 6,339,956 B1 | * | 1/2002 | Huinink et al. .......... | 73/146 |
| 6,481,806 B1 | * | 11/2002 | Krueger et al. .......... | 303/140 |
| 2002/0069008 A1 | * | 6/2002 | Nantz et al. ............ | 701/93 |
| 2002/0125770 A1 | * | 9/2002 | Hessmert et al. ........ | 303/191 |

FOREIGN PATENT DOCUMENTS

| | | |
|---|---|---|
| DE | 44 18 773 | 1/1996 |
| DE | 44 35 160 | 4/1996 |
| DE | 196 38 376 | 4/1997 |
| DE | 197 44 725 | 4/1999 |
| EP | 0 322 911 | 7/1989 |
| EP | 0 345 753 | 12/1989 |
| WO | 90 05646 | 5/1990 |
| WO | 97 44673 | 11/1997 |

* cited by examiner

Primary Examiner—Christopher P. Schwartz
Assistant Examiner—Xuan Lan Nguyen

(57) ABSTRACT

The invention relates to a method of controlling the performance of a motor vehicle in which the forces acting upon wheels and tires are detected by wheel force or tire sensors and are used as controlled variable(s) for an automotive servo-system, such as ABS, TCS, EMB etc. The variables are referred to determine and/or modulate the brake pressure in the wheel brakes of the wheels and/or the drive torque. The aim of the invention is to provide a method of controlling the performance of a motor vehicle which allows to optimize the influence on the movement of the vehicle. To this end, the working point and/or the operative range of the controlled variable(s) is adjusted using the detected wheel slippage.

16 Claims, 7 Drawing Sheets

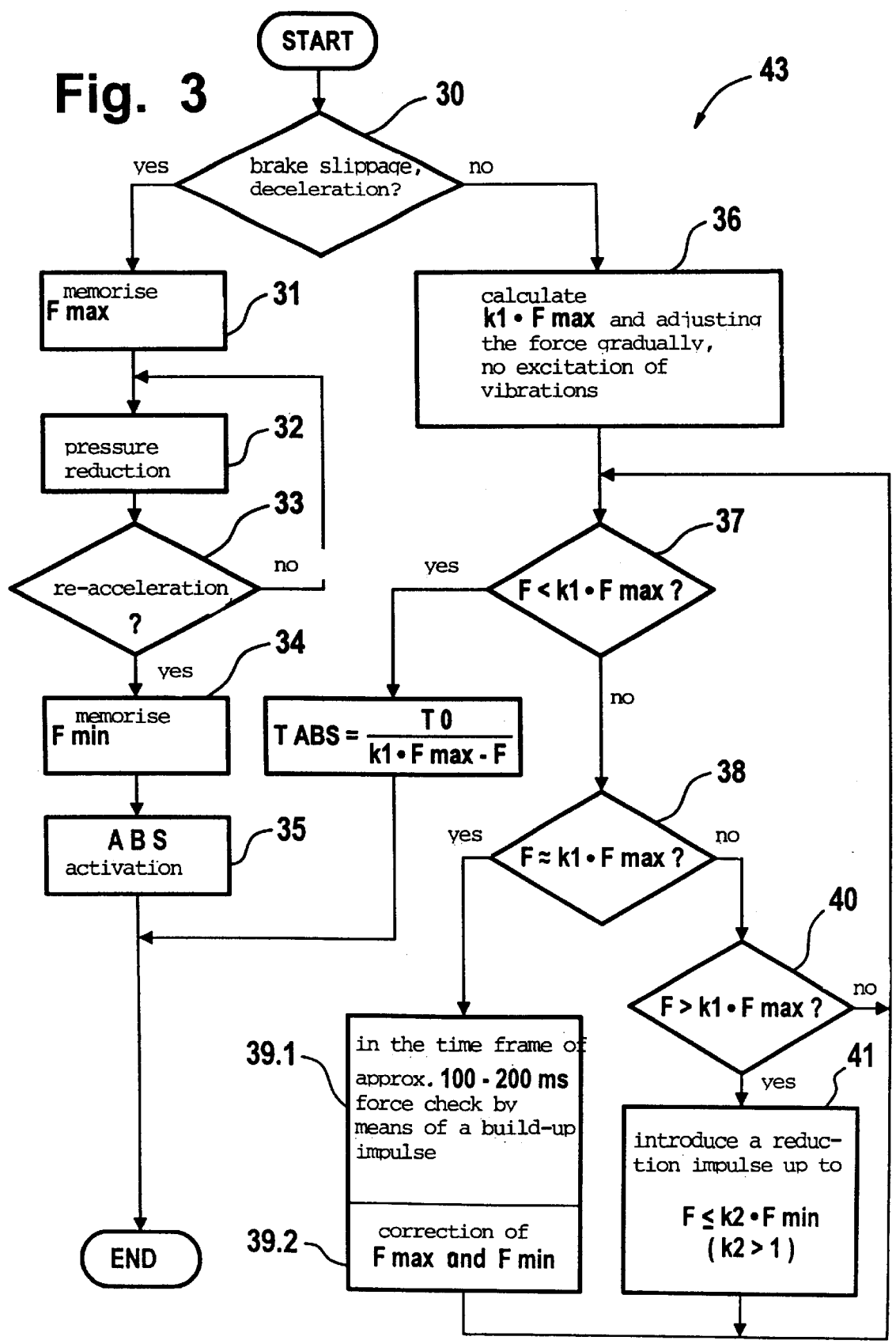

Fig. 4

```
                    ┌─────────────────────┐
                    │       START         │
                    └──────────┬──────────┘
                               │  50
                          ╱ drive  ╲
                         ╱ slippage ╲  no
                        ╱ or accel-  ╲──────┐
                        ╲ eration?   ╱      │
                         ╲          ╱       │
                          ╲        ╱        ▼
                           yes            ┌──────────────────────┐
                            │             │ 56  k1·Fmax calcul-  │
                    51 ┌────▼─────┐       │ ation and increase   │
                       │  Fmax    │       │ drive torque gradu-  │
                       │ memorise │       │ ally (avoid vibration│
                       └────┬─────┘       │ excitation) until    │◄──┐
                            │             │ F = k1·Fmax is adjus.│   │
                    52 ┌────▼─────┐       └──────────┬───────────┘   │
                       │ pressure │                  │               │
                       │ build-up │                  ▼ 57            │
                       │ reduce   │            ╱ F<k1·Fmax ╲  no     │
                       │drive torq│           ╱      ?      ╲────────┤
                       └────┬─────┘           ╲             ╱        │
                            │                  ╲           ╱         │
                       53   ▼                   yes                  │
                     ╱reduction╲                 │                   │
                    ╱ of drive  ╲ yes       58   ▼                   │
                   ╱  slippage   ╲─────┐   ╱withdrawal╲  no           │
                   ╲ Acceleration╱     │  ╱ of the     ╲──┐          │
                    ╲           ╱      │  ╲torque req? ╱  │          │
                     ╲         ╱       │   ╲          ╱   │          │
                       no              │    yes           │          │
                       │               ▼     │       59   ▼          │
                  54 ┌─▼────┐          │     │     ╱ increase  ╲ no  │
                     │ Fmin │          │     │    ╱ of coeffi-  ╲────┤
                     │memor.│          │     │    ╲ cient of    ╱    │
                     └──┬───┘          │     │     ╲ friction? ╱     │
                        │              │     │       yes            │
                  55 ┌──▼───┐          │     │        │    61        │
                     │activ.│          │     │        ▼              │
                     │ TCS  │          │  60 ▼   ┌──────────────┐    │
                     └──┬───┘          │ ┌──────┐│change the    │    │
                        │              │ │concl.││coefficient of│    │
                        │              │ │contr.││friction to   │    │
                        │              │ │TTCS= ││lower value,  │    │
                        │              │ │  T0  ││search new    │    │
                        │              │ │──────││working point │    │
                        │              │ │k1·Fmax││by means of  │    │
                        │              │ │  ·F  ││drive slippage│    │
                        │              │ └───┬──┘└──────┬───────┘    │
                        │              │     │          │            │
                        ▼              ▼     ▼          ▼            │
                    ┌───────┐                                        │
                    │  END  │                                        │
                    └───────┘                                        │
```

(Upper branch from 57 "no"):

62: $F \approx k1 \cdot F_{max}$ ? — yes → 63.1 in time frame of approx. 100msec force check by adding a torque → 63.2 correction of Fmax and Fmin 62: no → 64: $F > k1 \cdot F_{max}$ ? — no → back to 57
64: yes → 65: introduce a torque reduction up to $F \leq k2 \cdot F_{min}$ (k>1)

70

METHOD OF CONTROLLING THE PERFORMANCE OF A MOTOR VEHICLE

BACKGROUND AND SUMMARY OF THE INVENTION

The present invention relates to a method of controlling the performance of a vehicle in which the forces acting upon wheels and tires are detected by wheel force and tire sensors and are used as controlled variable(s) for an automotive servo-system, such as ABS, TCS, EHB, EMB etc. The variables are referred to in order to determine and/or modulate the brake pressure in the wheel brakes of the wheels and/or the driving torque.

A lot of similar methods controlling the performance of a motor vehicle are known which use the tire sensors for detecting the forces and moments acting upon the tires. While in EP 04 441 09 B1 the deformation of the tread area of the tire—the tread contact area—is monitored, in WO 96/10505 the deformation of the side wall—the torsion deformations—of a tire is detected by measuring a space of time between the passing of at least two marks on the rotating wheel which are located on different radii to the rotation axis. WO 97/44673 describes a tire sensor detecting a change of the phase position between measuring signals emitted by measuring elements due to forces acting upon the wheel in case of deformation and evaluating said change of the phase position as dimension for the moments and/or the actual coefficient of friction. In automotive servo-systems the forces acting upon the tire in such a way and detected by the tire sensor are referred to so as to determine and/or modulate the brake pressure in the wheel brakes of the wheels.

Apart from these automotive servo-systems which control the determination and/or modulation of the brake pressure in the wheel brakes of the wheel on the basis of forces detected with tire sensors and/or moments between the tire and the roadway, automotive servo-systems, such as ABS and/or TCS are referenced which are equipped with conventional sensor devices for detecting the four wheel speeds of a motor vehicle. If a wheel during braking or accelerating exceeds the optimal slippage area leading to the risk that the wheels block or spin, the ABS or TCS control automatically intervenes.

With said referenced automotive servo-systems, such as ABS or TCS, the information needed for the control is obtained by determining the rotational performance of the single wheels, where a vehicle reference speed is determined by logical linkage of the wheel rotation signals which approximately reflects a motor vehicle speed. Said vehicle reference speed is then referred to determine the wheel slippage and other controlled variables and finally to control the brake pressure in the wheel brakes of the wheels. Known ABS or TCS servo-systems determine the wheel slippage up to a slip limit value, i.e. the critical slip value, up to which the transmittable brake force or the drive torque only increases, by braking or driving the vehicle in excess of said critical slip, whereupon the circumferential wheel speed changes with regard to the vehicle reference speed in such a way that the tendency of the wheels to block or spin is detected. The control cycles consisting of the phases which appear in any sequence: maintain pressure, build up pressure, reduce pressure, can be repeated several times per wheel in presence of an ABS or TCS servo-system.

Since the critical slip has to be exceeded in order to recognize the slip limit value, the braking or driving performance in each ABS or TCS control cycle is reduced. At the same time the stopping distance is increased. By exceeding the critical slip the lateral forces on the wheel are reduced. The vehicle stability and the maneuverability of the vehicle is reduced.

SUMMARY OF THE INVENTION

It is therefore desirable to have a method of controlling the performance of a motor vehicle in which sensors detect or determine the slip limit value or a slip value on the wheel suitable for ABS or TCS control without having to exceed the slip limit value or critical slip value for detecting or determining it.

Tire sensors detecting the forces transmitted by the wheel onto the roadway and acting upon the tire may in principle be used as controlled variables in an ABS or TCS servo-system since they detect the forces immediately at the point where they develop. But since there are $\mu$-slip curves in which the coefficient of friction ($\mu$) increases in proportion to the slippage thus increasing the force between tires and roadway in case of blocking wheels, the slip values suitable for ABS or TCS control cannot be determined clearly by means of the forces detected with the tire sensors.

It is an object of the present invention to create a method of controlling the performance of a vehicle which allows to optimize the influence on the movement of the vehicle.

The particularity of the method consists in that the working point and/or operative range of forces detected by means of wheel force or tire sensors is adjusted by the detected wheel slippage at the beginning of an ABS or TCS control action. The wheel slippage is determined subject to values measured and/or calculated with conventional sensors, e.g. wheel speeds and motor vehicle reference speeds, and the evaluation of the dynamic rotational performance of the wheel. The working point and/or the operative range of the controlled variables detected with wheel force or tire sensors is adjusted by the simultaneous determination of the forces at the critical wheel slippage and/or at least one wheel slippage and at the wheel reversing point of the speed or its derivation in the first ABS or TCS control cycle. The maximum force is determined when the brake or drive slip or the negative (ABS) or positive (TCS) acceleration begins to increase, i.e. within the range of the critical slip value during the first ABS or TCS control cycle. Furthermore the minimum force is determined in case of a positive acceleration from the brake slip or a negative acceleration from the propulsive slip and re-acceleration from the wheel slippage. The working point and/or operative range of the controlled value "force" is adjusted by balancing the evaluated rotational performance of the single wheels and the vehicle reference speed during the critical slip with the forces determined by the wheel force or tire sensors, especially the longitudinal forces. Thus the present invention is based on the finding that the working point and/or operative range of the forces detected by means of wheel force or tire sensors is recognized at the beginning of the first control cycle by detecting the wheel slippage, i.e. the critical slippage, by means of the speed performance and the vehicle reference speed in order to determine definitely the frictional connection between tire and roadway and exclude errors of the controlled variables basing on $\mu$-slip curves in which the coefficient of friction ($\mu$) and thus the force between the tires and the roadway increases in proportion to the slip in case of blocking or spinning wheels.

The method according to the present invention allows that the working point and/or operative range of the forces acting upon the vehicle wheel is adjusted within the ABS or TCS control range of the wheel slippage. Therefore the rotational performance of the wheels in the unstable area is detected for the first time at the beginning of the control process and evaluated, if necessary, by including further variables. Afterwards the subsequent ABS or TCS control cycles, i.e. the control of the wheel slippage, are adjusted below the critical slip value up to the critical slip (slip limit value) by means of the forces detected with wheel force or tire sensors, as long as no external influences, as for example, changes of the coefficient of friction, shift the working point and/or the operative range and the slip limit value is exceeded.

According to a particularly advantageous embodiment of the present invention, the determination of the working point and/or operative range described above begins from the start so that the working point and/or operative range is adjusted according to the new parameters of condition variables.

It is a further advantage of the present invention that the critical wheel slippage and/or at least one wheel slippage in the ABS or TCS control range is determined on the basis of the values measured with conventional sensors, simultaneously determining the forces by means of wheel brake or tire sensors, because at the beginning the ABS or TCS control the working point or operative range of the controlled variable(s)—force—can be determined easily by means of conventional control methods.

One embodiment foresees that in a first ABS or TCS control cycle a force is determined on the one hand in case of increasing brake or drive slip and/or an acceleration of the wheels and on the other hand at a wheel reversing point of the speed or its derivation, i.e., in case of a re-acceleration from the brake slippage or a deceleration from the propulsive slippage of the wheels, because the forces in case of increasing brake or drive slip or an acceleration of the wheels not only depend on the slip and/or the deceleration but also on the increase of force which is influenced by different parameters, as for example a lower pressure of the wheels or wheels with higher slippage need.

Since the forces are determined preferably at the beginning of the brake or drive slip increase and/or acceleration of the first ABS or TCS control cycle, the controlled variables determined by means of the wheel force or tire sensors can be referred to for ABS or TCS control immediately after having determined the forces, so that said controlled variables determined by means of the sensors can be controlled within a stable wheel slippage range, thus avoiding a reduction of the lateral force existing in the unstable wheel slippage range, the impairments of the vehicle steering connected with this as well as the reduction of the brake performance.

In another embodiment of the present invention the brake pressure or the drive torque is controlled according to the relation $$F = k_1 \times F_{max}$$

with $F_{max}$=longitudinal force in the critical slip range $k_1$=proportionality factor F=actual longitudinal force on entering the area of driving stability. In order to eliminate vibrations of the chassis, the longitudinal force is adjusted in a stepped manner. After having determined the first working point as described above, reduced the wheel slippage with the controlled variable $F_{max} \times k_1$ and adjusted the brake pressure corresponding to the force of the basic drive torque, the force and the slippage and the acceleration on the wheel are observed. If the product $F_{max} \times k_1$ is bigger than the forces F detected with the wheel force or tire sensors, the ABS or TCS control is concluded prematurely according to the relation:

$$T_{ABS\ TCS} = \frac{T_0}{k_1 \times F_{max} - F}$$

$T_0$ being a theoretical time between 60 and 90 ms, preferably 70–80 ms and T$_{ABS}$/TCS being the exiting time.

By building the product $F_{max} \times k_1$ and the evaluation, i.e. if $F_{max} \times k_1$ is bigger than the forces F detected by means of the wheel force or tire sensors, an increasing coefficient of friction between tire and roadway can be assumed with constant brake pressure introduction or drive torque preset by the driver. In this case the ABS or TCS mode is left prematurely with an exiting time which is indirectly proportional to the difference $k_1 \times F_{max} - F$ because a vehicle performance with decreasing blocking or drive slip tendency can be assumed.

If the evaluated product $F_{max} \times k_1$ corresponds approximately to the force F measured with the wheel force or tire sensors, a braking or acceleration with homogeneous coefficient of friction can be assumed. The evaluation of $k_1 \times F_{max}$ depends on the exact determination of the force $F_{max}$ determined at increasing brake or drive slip or during the acceleration of the wheels, and thus the braking performance in case of ABS control and the performance of the drive and the acceleration in case of TCS control.

By means of self-testing cycles the forces $F_{max}$ and $F_{min}$ are continuously updated and corrected, if necessary. For this reason the brake pressure is modulated or built up after a certain space of time by means of a pressure build-up impulse which is introduced into the servo-system and/or by means of a added drive torque introduced into the TCS control cycle, where the positive or negative acceleration of the wheels and the forces is determined. The evaluation of the change of the measured forces and the acceleration leads to the assumption that the brake or drive force is insufficient, e.g. if the forces F increase and the acceleration remains unchanged, i.e. if the forces F increase without an increased acceleration being determined. In other words: the forces F measured and evaluated with the tire sensors, in particular the longitudinal forces detected between tires and roadway, do not correspond to the forces which can be transmitted from the wheel or wheels onto the roadway. In this case the working point or operative range must be found once again.

According to one embodiment of the present invention the force $F_{max}$ and/or the acceleration is evaluated by comparison with a threshold value (S) and an instability and thus a brake slip or a drive slip is caused when the threshold value is exceeded by the modulation or the build-up of brake pressure or the increase of the drive torque, so that a new adjustment of the working point by means of the wheel slippage is caused as described above. New adjustment or new determination of the working point is preferably begun by means of the wheel slippage in case of high vehicle speeds or high forces.

According to another embodiment of the present invention, the maximum force $F_{max}$ or the acceleration is evaluated by means of comparison and the measured force F is approached to the maximum force ($F_{max}$) by means of a modulation or the build-up of the brake pressure by introducing at least one pressure build-up impulse, usually several pressure build-up impulses and/or a drive torque added into the control system, if the threshold value (S) is not reached, in particular in case of $F_{max}$ or a(acceleration)

<S. In this case the wheel being considered presents a small extent of slippage, i.e. the critical slip value is exceeded and a new working point is adjusted. Control is foreseen in an advantageous manner in case of low force or low vehicle acceleration.

A further embodiment of the method foresees that in case of an approximately constant or non increasing force F and an increase of the positive or negative acceleration or the measured force according to the relation $F > k_1 \times F_{max}$ the wheel or wheels are within the ABS or TCS control range of the wheel slippage. In this case a drive torque or brake pressure reduction is introduced by means of a brake pressure reduction impulse of approx. Tp=2 ms or an added drive torque until $F \leq k_2 * F_{min}$ with $k_2 > 1$.

Additional objects and features of the present invention will be readily apparent to those skilled in the art from a review of the attached drawings, the following detailed description and the appended claims.

BRIEF DESCRIPTION OF THE DRAWINGS

FIG. 3 a flow chart of the ABS function;

FIG. 4 a flow chart of the TCS function;

DETAILED DESCRIPTION OF THE INVENTION

Figure 1:
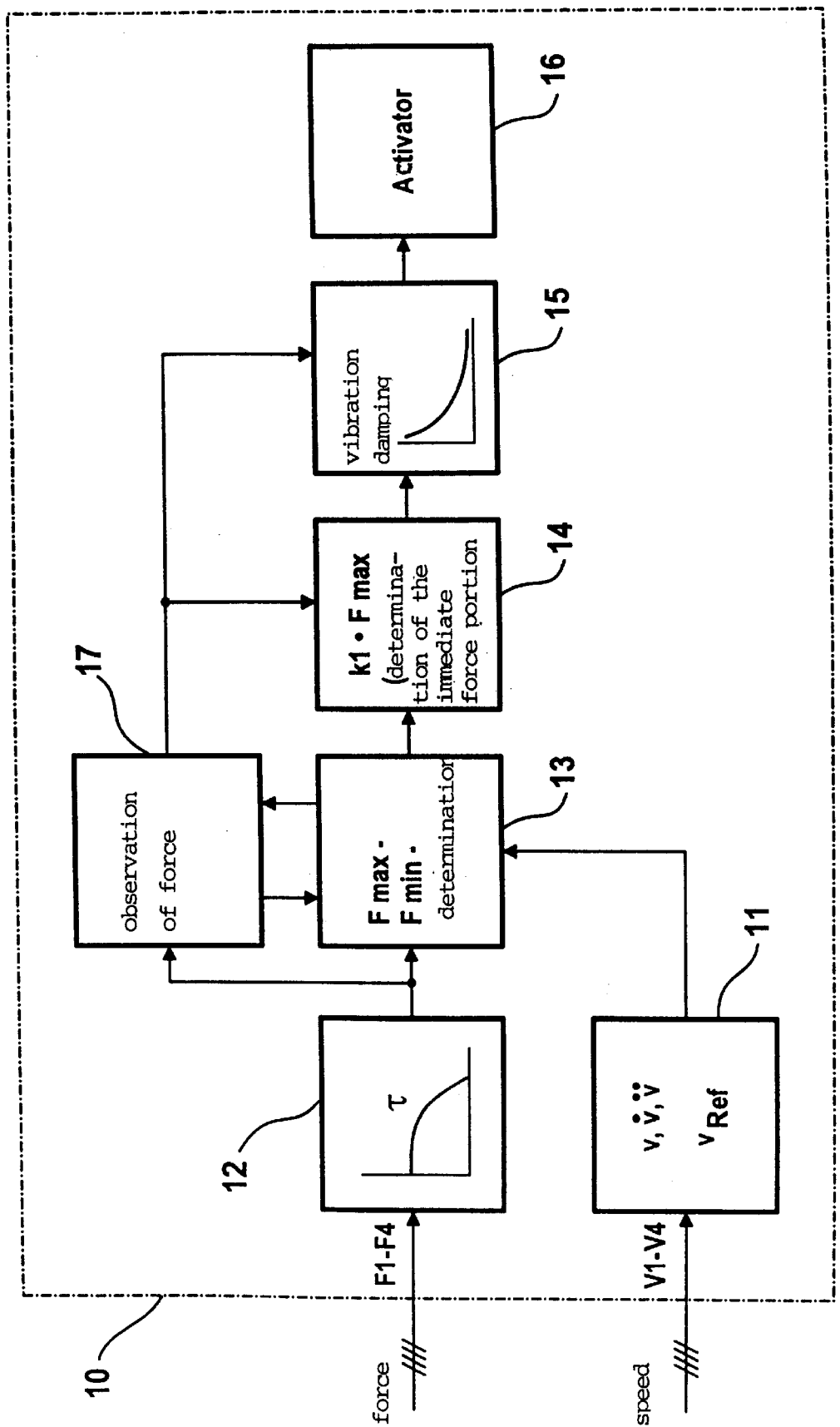
FIG. 1 a schematic representation of integrating the force sensors into the ABS/TCS function.

FIG. 1 represents the basic construction of the electronic circuit of the ABS or TCS controller 10. The signals V1 to V4 obtained with conventional wheel sensors are first processed in a circuit 11 and amplified. By comparing the output signals of said circuit 11 applying certain selection criteria a reference speed Vref is built which in conventional brake systems serves as reference value for the brake pressure control in the single wheel brakes control channels. The deceleration and acceleration of the single wheels, the change of these values (the so-called jerk), the wheel slippage etc. are determined by processing the wheel signals in the known way. The wheel force signals F1 to F4 obtained with a wheel force or tire sensor are processed in a filter 12 parallel to the circuit 11, while the maximum force $F_{max}$ and the minimum force $F_{min}$ are determined in a logic unit 13 according to certain criteria. The forces $F_{max}$ and $F_{min}$ are defined as follows:

In the ABS control cycle, $F_{max}$ is the force at which a clear brake slip increase or deceleration is determined. $F_{min}$ is the force at which a clear speed reverse or acceleration reverse (re-acceleration from the brake slip) is determined.

In the TCS control cycle, $F_{max}$ is the force at which a clear drive slip increase or acceleration is determined. $F_{min}$ is the force at which a clear speed reverse (deceleration from the propulsive slip, re-acceleration from the slip) is determined.

Circuit 11 is connected with logic unit 13 in order to determine $F_{max}$ and $F_{min}$. $F_{max}$ and $F_{min}$ are determined by evaluating the information on the wheel slippage determined in the first ABS or TCS control cycle in circuit 11 and linked to the wheel force signals F1 to F4 in the logic circuit. The critical wheel slippage and/or a wheel slippage in the ABS or TCS control range determined with conventional wheel sensors is referred to to adjust the working point and/or operative range of the determined actual forces F.

A unit 14 is connected to the output of the logic unit 30, in order to determine the immediate force portion k1×Fmax, said unit introducing the control deviation into a circuit 15 in the form of electrical signals. Thus in said circuit 15 brake pressure control signals in the form of at least one pressure build-up impulse Fxt are introduced into one activator 16, subject to the forces determined and their working point. Several partial build-up impulses following quickly to one another are preferably built in circuit 15 for building up the pressure and lead to an activator, in order to avoid the vibration of the chassis.

In addition to the unit 14 an observing unit 17 is connected to the output of the logic unit 13 to which the filtered force signals F1 to F4 of the wheel force or tire sensors and the signals $F_{max}$ and $F_{min}$ are led. The observer unit recognizes the situation by evaluating different information linked and/or created in the logic circuit and compared with the force signals. The corresponding information resulting from the comparison is led back to the logic circuit 13, the unit 14 and the circuit 15 and considered during the determination of the values $F_{max}$, $F_{min}$ $k_1 \times F_{max}$ as well Fxt.

Figure 2:
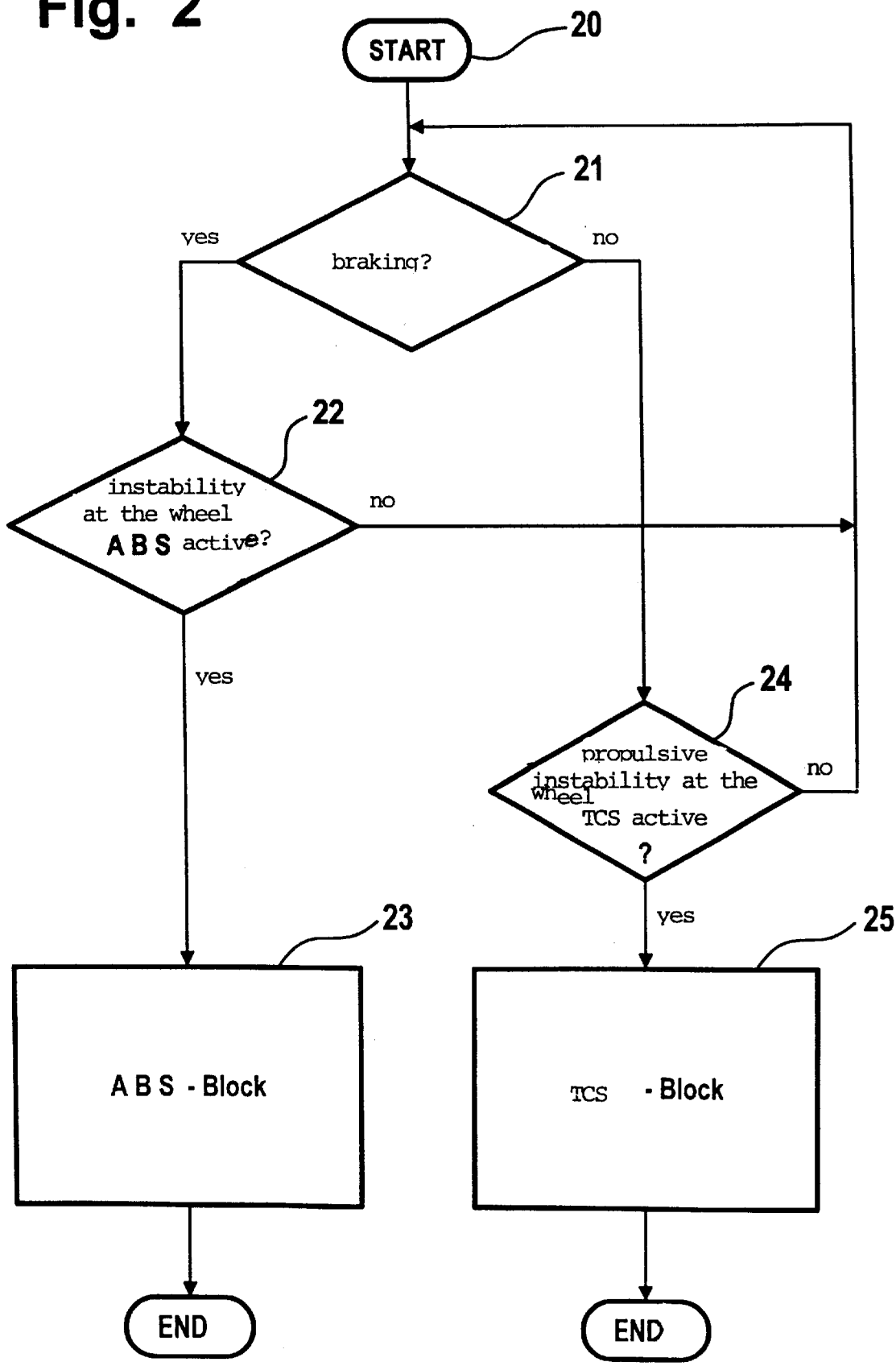
FIG. 2 a schematic representation of initializing the ABS or TCS function.

FIG. 2 represents the basic method leading to the beginning of the ABS or TCS function. The logical branches are represented as lozenge in the flow chart.

On the basis of a given situation still to be determined (Start 20) in lozenge 21 is determined whether or not there is a brake maneuver. For this reason the longitudinal acceleration along can be compared with a threshold value. If the value along lies below the threshold value alongmin, this only means that there is a negative longitudinal acceleration, i.e. a deceleration, so that—considered in simplified manner—a brake maneuver can be assumed. If the longitudinal acceleration lies above the threshold value, the vehicle is driving in an accelerated or constant manner which excludes a brake maneuver. If the previous run has detected a brake maneuver, in lozenge 22 the instability at the wheel is enquired. If there is an instability and the ABS function is active, the ABS control (ABS block 23) according to FIG. 3 is begun.

If, however in lozenge 21 is determined that there is no brake maneuver, in lozenge 24 is enquired whether or not there is a propulsive instability at the wheel and the TCS function is switched active. In this case begins the TCS control (TCS block 25) according to FIG. 4. If in lozenge 22 or lozenge 24 no wheel instabilities have been determined, there is no need for a control. The system is switched back to Start 20 of the enquiry and the enquiry is cycled again and again.

Figure 5:
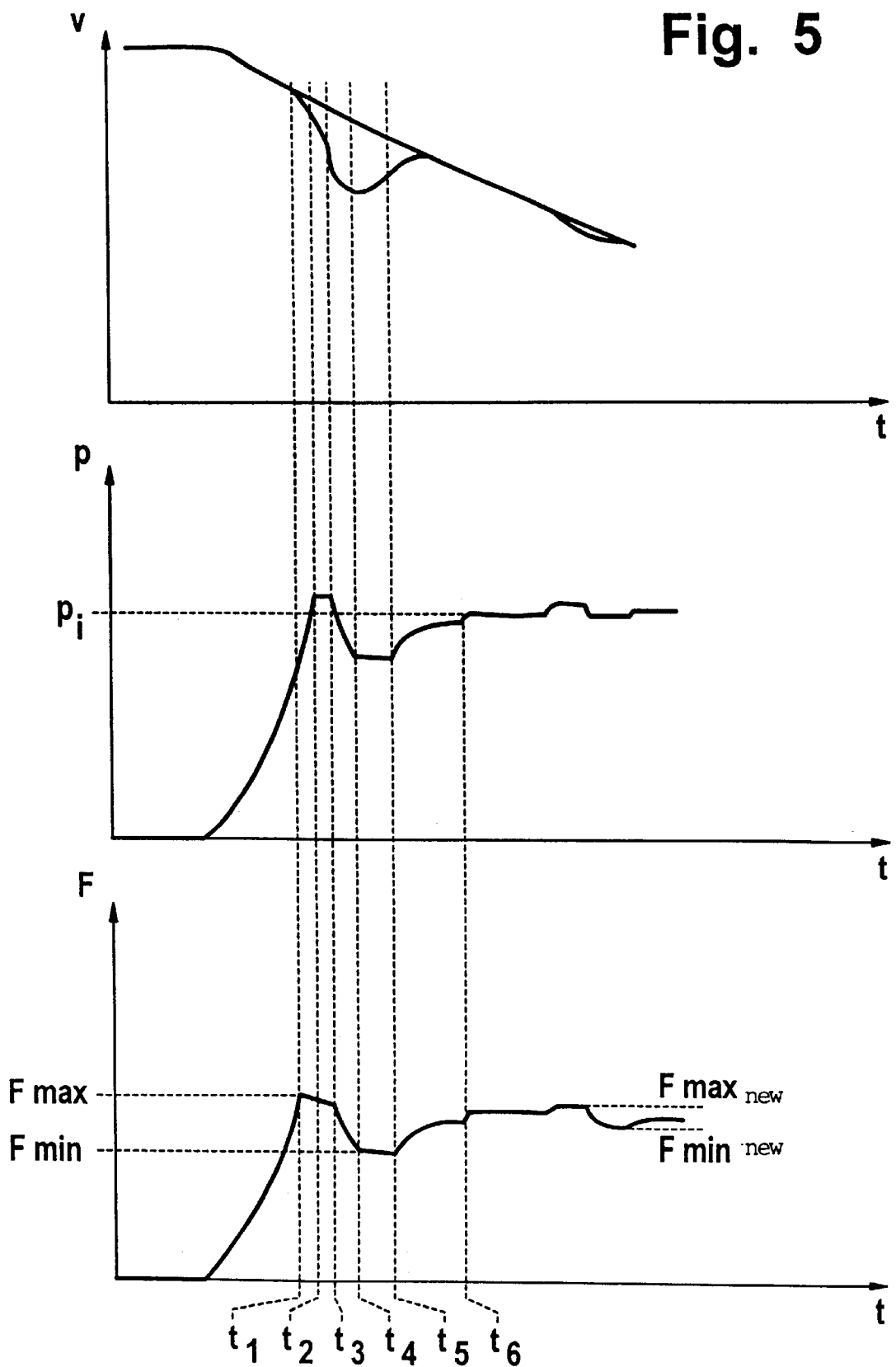
FIG. 5 a change of the speed of a wheel during the ABS control, the brake pressure in the wheel and the change of the force between tire and roadway at the same time on homogeneous ground.

The flow of the ABS control is now described on the basis of FIG. 3 in connection with FIG. 5 which represents in a very simplified manner the connections between wheel speed v, pressure p and force signal F during a controlled brake maneuver with a homogeneous coefficient of friction. At the time t1 the wheel x being in the pressure build-up phase and being considered here, becomes unstable. At this moment, in the wheel brake of this wheel prevails a brake pressure p. During the first ABS control cycle, the beginning of the brake slip determined by means of conventional wheel speed sensors at which the wheel becomes unstable, is enquired in lozenge 30, in order to determine the force between tire and roadway at time t1. At the same time the force signal Fmax detected with wheel force or tire sensors at which a clear increase of the brake slip or a corresponding deceleration (reduction of the circumferential wheel speed) at the wheel is detected at time t1 at which the wheel being considered becomes unstable is determined and memorized (31). The electronic controller closes the intake valve of the brake system on the basis of the determined blocking tendency so that the brake pressure p at time t2 even in case of further increasing activation pressure cannot be increased anymore. The force determined with wheel force or tire sensors decreases during the pressure keeping phase with increasing brake slip since the frictional connection between tire and roadway decreases. If the brake slip increases until time t3 despite a constant brake pressure p, the pressure is beginning to be reduced 32. For this reason the electronic controller keeps the intake valve closed and opens the outlet valve for a short period of time. In lozenge 33 is enquired whether the wheels have been re-accelerated (increase of the circumferential wheel speed) from the brake slip due to the pressure reduction in the wheel brakes. If in lozenge 33 it is determined that the wheels have not been re-accelerated, the pressure reduction 32 is repeated once again. If in lozenge 33 is determined that wheel x has been accelerated again, i.e. the wheel x is within the range of a wheel reversing point of the speed or the acceleration, in 34 the force signal $F_{min}$ determined by wheel force or tire sensors at which a re-acceleration from the brake slip is realized, is determined and memorized at time t4. In 35 the ABS control cycle is put into active mode, i.e. switched to control circuit 43, and the further brake control is continued by the force signals in the form of controlled variables determined by the wheel force or tire sensors. After having concluded the determination of $F_{max}$ and $F_{min}$ thus having determined the working point for a operative range in the first ABS control cycle, the brake pressure is determined and/or modulated according to relation F=k1×Fmax in step 36 when the stability is reached at time t5. k1<1 is a proportionality factor by which a force below Fmax is adjusted. In circuit 15 the force signals are transformed into correcting variables, preferably brake pressures (or valve switching times etc.) and introduced into the wheel brakes by means of several partial build-up impulses following quickly to one another, so that the impulse F×t does not cause a vibration of the chassis.

After having reduced the wheel slippage and adjusted the brake pressure corresponding to the determined force signals, observer unit 17 begins to observe the force and brake slip deceleration on wheel x.

Figure 6:
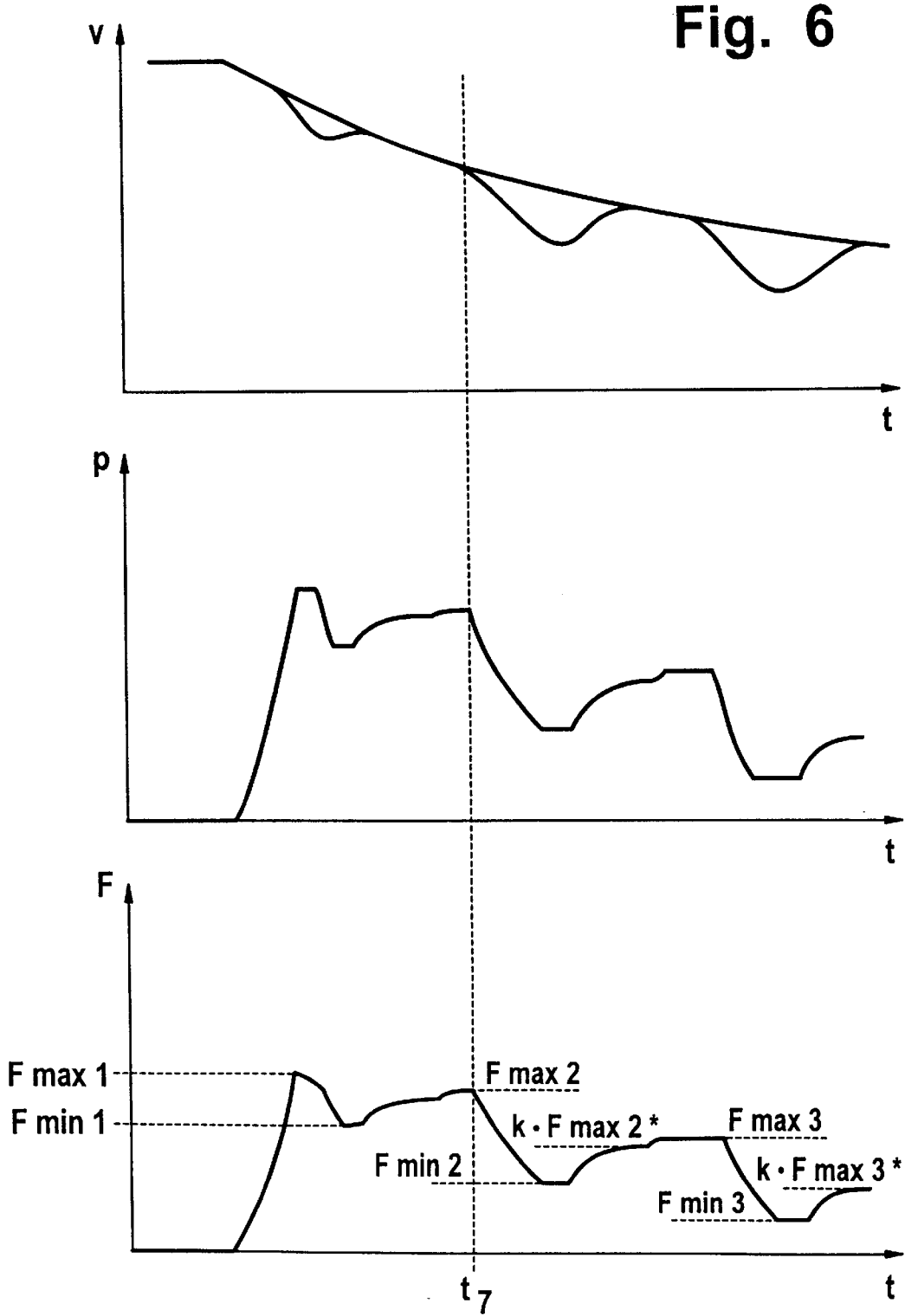
FIG. 6 the change of the speed of a wheel during the ABS control, the brake pressure in the wheel and the change of the force between tire and roadway at the same time with decreasing coefficient of friction.

FIG. 6 describes in connection with FIG. 3 the very simplified connections between wheel speed v, pressure p and force signal F during a controlled brake maneuver at a decreasing coefficient of friction. Up to time t7 the method corresponds to the method of determining Fmax and Fmin described in FIG. 5 and to the subsequent brake force control by the force signals F1 to F4 determined by wheel force or tire sensors. If the wheel x which is being considered here and is in a pressure build-up phase, is again unstable at time t7, e.g. due to a decreasing coefficient of friction, the working point and/or operative range of the controlled variable(s) is adjusted again by means of the wheel slippage—as described in FIG. 5 above. Due to the decreasing coefficient of friction there are further control cycles in which each instability of the wheel x leads to the determination of Fmax2 and Fmin2 up to FmaxY and FminY by means of the signals of the conventional wheel sensors. In this context the proportionality factor $k_{1max2}$ is introduced into the reference and/or modulation of the brake pressure following the first determination of Fmax and Fmin on the basis of $F=k_{1max2} \times F_{max2}$, which considers the entity of the brake pressure reduction in the preceding instability and the deceleration of the wheel x in the instability phase.

Figure 7:
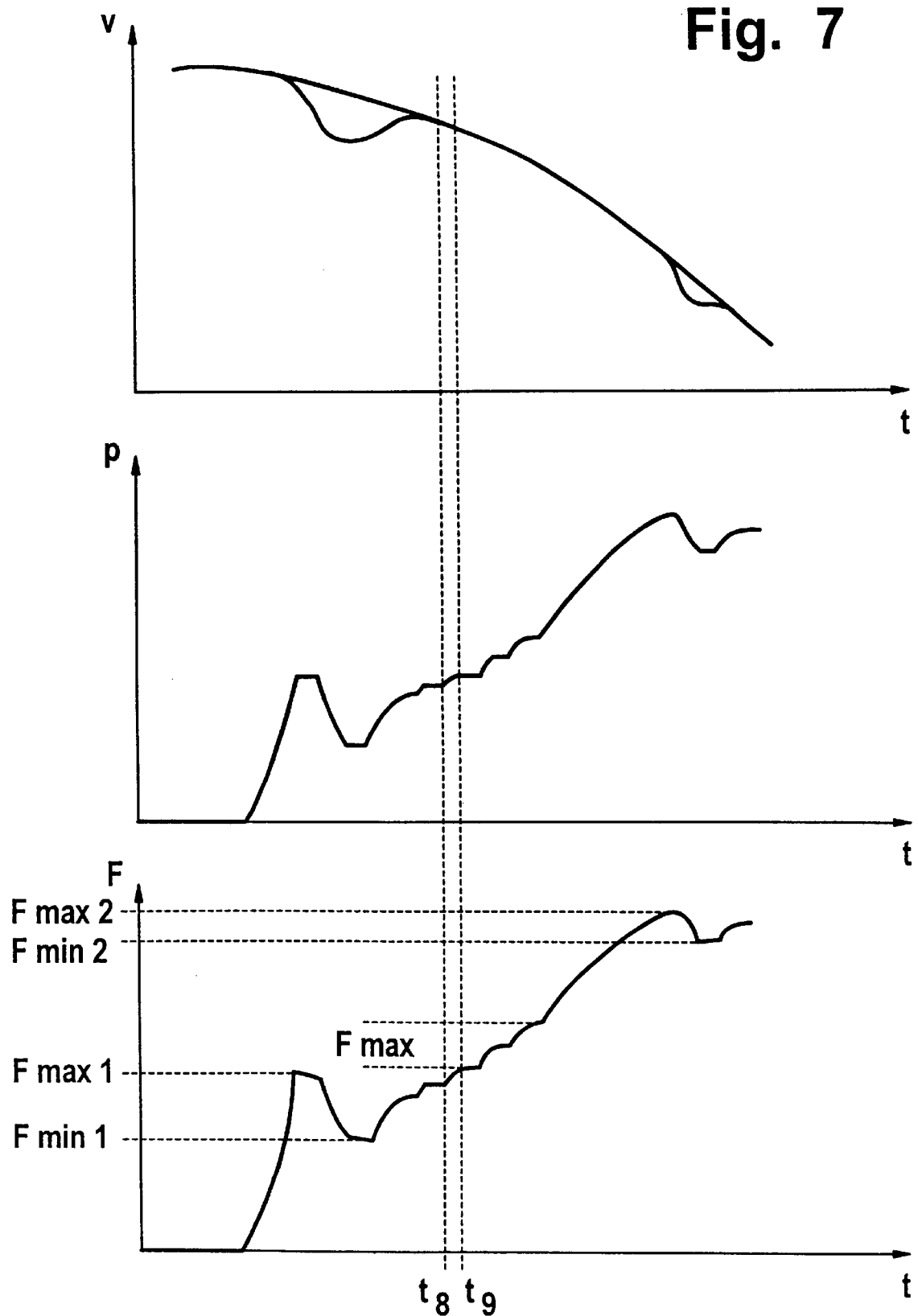
FIG. 7 the change of the speed of a wheel during the ABS control, the brake pressure in the wheel and the change of the force between tire and roadway at the same time with an increasing coefficient of friction.

FIG. 7 shows the change of speed of a wheel during an ABS control, the brake pressure in the wheel and the change of the force between tire and roadway at the same time in presence of an increasing coefficient of friction.

Up to time t8 the method corresponds to the method of determining Fmax and Fmin described in FIG. 5 and to the subsequent brake force control by the force signals detected by means of the wheel force or tire sensors. If due to an increasing coefficient of friction and constant pressure values preset by the driver the relation enquired in lozenge 37 F<k1×Fmax is fulfilled, in which the longitudinal force F between tire and roadway is smaller than the brake pressure at time t9, adjusted with the force signal(s) k1×Fmax and detected by wheel force or tire sensors, the ABS control cycle is terminated prematurely according to the relation $$T_{ABS/TCS} = \frac{T0}{k_1 \times F_{max} - F}$$

where k1 is a proportional constant, T0 a nominal time between 60 and 90 ms, preferably 70 to 80 ms, and TABS/TCS exiting time indirectly proportional to the difference k×Fmax.

The method according to FIG. 3 is repeated adjusting again the working point and/or operative range (Fmax2, Fmin2 of FIG. 7) of the controlled variable(s) by means of the wheel slippage subject to the higher relations of the coefficient of friction in case of a new instability of the wheel x.

If in lozenge 37 it is determined that the force signal F determined by wheel force or tire sensors is not smaller than k1×Fmax, the relation $F \sim k_1 * F_{max}$ is enquired in lozenge 38. If the actual force F detected by the sensors corresponds substantially to the product k1×Fmax, at time t6 (FIG. 5) in step 39.1 a pressure build-up impulse is introduced into the wheel brake in a period of time between 100 and 200 ms, preferably immediately after the decision or according to certain stability criteria. The amount of the pressure build-up impulse can be derived from the remaining or actual control deviation Fmax−Fmax×k1 with brake pressure pi at time t6 or be built by means of a constant factor of a characteristic line taken from a table. If the wheel force or tire sensors detect an increase of the actual force F without the conventional wheel speed sensors detecting an increase of deceleration on the wheel, the brake pressure introduced into the wheel brake lies below the maximum possible brake pressure. A brake force is assumed lying below the maximum possible brake force at which the frictional connection which corresponds to the actual coefficient of friction, is exploited completely. The working point for an operative range of the control variable 'Force F' is adjusted again by means of the wheel slippage. For this reason, in step 39.2 the working point is updated by correcting the forces Fmax and Fmin. According to one embodiment the control is repeated starting from lozenge 37. If after the first pressure build-up impulse in lozenge 38 there is still a relation $F \sim k_1 * F_{max}$, in step 39.1 another pressure build-up impulse is given. The determination of the actual force is repeated again after having introduced one or more pressure build-up impulses into the wheel brake in step 39.1. By approaching the force maximum with little pressure build-up impulses preferably at a high vehicle deceleration or frictional connection Fmax between tire and roadway, the actual force F is gradually increased until in lozenge 38 is determined that the actual force F determined by means of wheel force or tire sensors does not substantially correspond to the preset force k1×Fmax. In lozenge 40 is further enquired whether the force detected by wheel force or tire sensors is F>k1×Fmax or whether the deceleration of the wheel x increases while an increase of the actual force F cannot be detected. On the basis of the result in lozenge 40, it is assumed, that the frictional connection is completely exploited if F>k1×Fmax. The wheel x which is being considered is located on the maximum of the $\mu$-slip curve. As a precaution, in step 41 is introduced at least one short pressure reduction impulse into the wheel brake within a period of time of approx. tp~2 ms until F≦$k_2$ * $F_{min}$, with k2>1. Afterwards the method according to FIG. 3 is repeated again.

According to a further embodiment, in step 39.1 a massive pressure build-up is activated in the wheel brake, preferably in case of a low frictional connection Fmax and low vehicle deceleration, i.e. a pressure build-up which causes the possible frictional connection between tire and roadway, which in step 39.2 thus leads to a correction of Fmax and Fmin because the considered wheel becomes unstable and the method according to FIG. 3 is repeated again.

Now the method of the TCS control is explained on the basis of FIG. 4. At a certain moment the driven wheel x which is being considered here, becomes unstable. At that time a drive torque is applied to the wheel which causes the tendency of the wheel x to spin. In order to determine the force between tire and roadway at that moment, first the beginning of the drive slip which is determined by means of conventional wheel speed sensors and at which the wheel x is becoming unstable, is enquired in lozenge 50 in the first TCS control cycle. At the same time the force signal Fmax determined by wheel force or tire sensors is determined and memorized (51) at which a clear increase of the drive torque or a corresponding acceleration (increase of the circumferential wheel speed) at the wheel is ascertained. The electronic controller reduces the drive torque subject to the spinning tendency of wheel x which has been ascertained. For this reason it closes e.g. the separating valve of the known brake system so that brake pressure fluid from an auxiliary pressure source can be introduced into the wheel brake when the intake valve is open and the outlet valve is closed. In addition to that it can reduce the motor torque. The force determined by wheel force or tire sensors increases on the basis of the introduced reduction of the drive torque with decreasing drive slippage since the frictional connection between tire and roadway is increasing. In lozenge 53 it is enquired whether the drive torque has been reduced and the wheels decelerated from the drive slippage due to the reduction of the drive torque. If during the run it is ascertained that the drive torque has not been reduced and/or the wheels not been decelerated and the drive slippage has not decreased, the pressure build-up and/or the reduction of the drive torque 52 is repeated. If in lozenge 53 a reduction of the drive slippage and/or deceleration of the wheel x has been ascertained, i.e. wheel x is in an area of a wheel reversing point of the speed or of the acceleration (deceleration from the propulsive slippage), in 54 the force signal Fmin determined by wheel force or tire sensors at which a deceleration from the propulsive slippage or a re-acceleration from the slip is realized, is defined and memorized at that moment. The TCS control cycle is activated, i.e. switched to the control circuit 70 and the further traction control is continued by means of controlled variables in the form of force signals determined by wheel force or tire sensors. After having concluded the determination of Fmax and Fmin and having thus defined a working point and/or an operative range in the first TCS control cycle, the determination and/or modulation of the drive torque is adjusted in step 56 according to the relation F=k1×Fmax, if the stability has been reached. k1<1 is a proportionality factor by which a force below Fmax is adjusted. In circuit 15, the force signals are transformed into correcting variables, preferably brake pressures and/or motor torques etc. and adjusted in a stepped manner, so that the impulse F×t created cannot cause vibrations on the chassis.

After the wheel slippage has been reduced and the drive torque corresponding to the determined force signals has been adjusted, observer unit 17 begins to observe force and drive acceleration on wheel x. If wheel x, which is being considered here, becomes unstable again at a certain moment, e.g. due to a decreasing coefficient of friction, the working point and/or operative range of the controlled variable(s) is adjusted again by means of the wheel slippage—as described above in connection with FIG. 4.

If the relation F<k1×Fmax enquired in lozenge 57 is fulfilled due to an increasing coefficient of friction and/or a reduced drive torque preset by the driver, at which the longitudinal force F between tire and roadway determined by wheel force or tire sensors is smaller than the preset drive torque adjusted with the force signal(s) k1×Fmax and if in lozenge 58 is ascertained that the drive torque preset by the driver is reduced, in step 60 the TCS control cycle is concluded prematurely according to $$T_{ABS/TCS} = \frac{T0}{k_1 * F_{\max} - F}$$

with an ending time that is indirectly proportional to the difference k1×Fmax-F, where k1 is a proportional constant, T0 is a nominal time between 60 and 90 ms, preferably between 70 and 80 ms, and TABS/TCS is the ending time. If however in lozenge 58 no reduction of the drive torque by the driver can be ascertained, in lozenge 59 is further enquired whether the coefficient of friction increases. If by observing the force of the added drive torque is ascertained that the coefficient of friction increases proportionally to the observation of the acceleration performance of the wheel, in step 60 the TCS control cycle is also concluded prematurely according to the relation $$T_{ABS/TCS} = \frac{T0}{k_1 * F_{\max} - F}$$

with an ending time that is indirectly proportional to the difference k1×Fmax-F, where k1 is a proportional constant, T0 is a nominal time between 60 and 90 ms, preferably between 70 and 80 ms, and $T_{ABS/TCS}$ is the ending time. If however in lozenge 59 it is ascertained that the coefficient of friction did not increase, in step 61 a reduction of the coefficient of friction is assumed and the TCS working point or an TCS operative range has to be found again by means of the drive slip as described above.

The method according to FIG. 4 is repeated, adjusting again the working point and/or operative range (Fmax, Fmin) of the controlled variable(s) by means of the determined wheel slippage taking into account the lower relations of the coefficient of friction if an instability of wheel x is developing.

If in lozenge 57 it is ascertained that the force signal F determined by wheel force or tire sensors is not smaller than k1×Fmax, the relation F~$k_1$*$F_{max}$ is enquired in lozenge 62. If the actual force F determined by means of the sensors corresponds substantially to the product k1×Fmax, within 100 ms after the decision or according to certain stability criteria in step 63.1 the force is checked by introducing an added drive torque. The entity of the added drive torque can be built by means of a constant factor on the basis of a table or a characteristic line. If the wheel force or tire sensors determine an increase of the actual force F without the conventional wheel speed sensors detecting an increasing acceleration at the wheel, it is assumed that the drive force is too low, lying below the maximum possible propulsive force at which the frictional connection is exploited completely thus corresponding to the actual coefficient of friction. The working point of an operative range of the controlled variable "force F" can be adjusted again by means of the wheel slippage. For this reason in step 63.2 the working point is updated by correcting the forces Fmax and Fmin. According to one embodiment the control is starting again from lozenge 57. If after the first addition of drive torque in lozenge 62 it is still ascertained that F~$k_1$*$F_{max}$, in step 63.1 a further drive torque is added. The subsequent determination of the actual force begins again after having introduced one or more added drive torque(s) in step 63.1. By this cautious approach to the force maximum with little drive torque additions preferably at a high vehicle acceleration or high frictional connection Fmax between tire and roadway, the actual force F is increased gradually until in lozenge 62 it is ascertained that the actual force F determined by wheel force or tire sensors does not correspond substantially to the preset force k1×Fmax. In lozenge 64 it is further enquired whether the force F determined by wheel force or tire sensors is >k1×Fmax or whether the acceleration of wheel x increases, while the increase of the actual force F cannot be determined. On the basis of the result in lozenge 64 it is assumed that the frictional connection is exploited completely, if F>k1×Fmax. The wheel which is being considered is located on the maximum of the $\mu$-slip curve. As a precaution, in step 65 is introduced at least on small drive torque reduction over a period of time of approx. tp~2 ms until F≦$k_2$*$F_{min}$ with k2>1. Afterwards the method according to FIG. 4 is repeated.

According to another embodiment of the present invention, preferably in case of low frictional connection Fmax and low vehicle acceleration, in step 63.1 a massive drive torque is added, i.e. a drive torque addition lying above the possible frictional connection between tire and roadway leading in step 63.2 to a correction of Fmax and Fmin by that the wheel being considered is unstable and the method according to FIG. 4 is repeated.

Additional objects and features of the present invention will be readily apparent to those skilled in the art from a review of the attached drawings, the following detailed description and the appended claims.

What is claimed is:

1. A method of controlling the performance of a motor vehicle according to which the forces acting upon the tires are detected by wheel force or tire sensors and are used as controlled variable(s) for an automotive servo-system, including ABS, TCS, EHB, and EMB, and with which the controlled variables are referred to determine or modulate, or both determine and modulate, a brake pressure in the wheel brakes of the wheels or a drive torque, or both the brake pressure and the drive torque, wherein a working point or operative range of controlled variable(s), or both the working point and operative range, is adjusted by means of a detected wheel slippage, the working point or operative range, or both the working point and operative range, is determined subject to variables, including at least one of wheel speeds or vehicle reference speed, either detected or calculated, or both detected and calculated, by means of sensors.

2. A method according to claim 1 wherein at least the critical wheel slippage or at least one wheel slippage, or both the critical wheel slippage and at least one wheel slippage, in the ABS or TCS control range is determined simultaneously with the detection of the forces (Fmax, Fmin) by the wheel speed or tire sensors on the basis of the values (V1, V2, V3, V4, Vref) detected by sensors.

3. A method according to claim 1 wherein a force (Fmax) is determined in a first ABS or TCS control cycle in case of an increase of the brake or drive slippage or an acceleration of the wheels, or the brake or drive slippage and the acceleration of the wheels, and a force (Fmin) is determined in the range of the wheel reversing point of the speed or its derivation.

4. A method according to claim 3, wherein the force Fmax is determined at the beginning of the brake or drive slippage increase or the acceleration of the wheels, or the brake or drive slippage increase and the acceleration of the wheels, in the first ABS or TCS control cycle.

5. A method according to claim 1 wherein the force Fmin is determined in presence of a positive acceleration from the brake slippage or a negative acceleration from the propulsive slippage of the wheels of the first ABS or TCS control cycle.

6. A method according to claim 1 wherein the working point or the operative range of the controlled variable(s), or both the working point and operative range, are adjusted again with each instability of the wheels by means of the wheel slippage.

7. A method according to claim 1 wherein the determination or modulation, or both the determination and modulation, of the brake pressure or the drive torque, or both the brake pressure and the drive torque, is controlled according to the relation $$F = k1 \times F\text{max}$$

with k1=proportionality factor

F=Actual longitudinal force between tire and roadway when entering the driving stability area.

8. A method according to claim 1 wherein during the ABS braking maneuver or the TCS propulsion the product ($k_1 \times F_{max}$) resulting from the maximum force (Fmax) and a proportional factor ($k_1$) into which a period of time $t_{impulse}$ from the beginning of the change of force due to the build-up or the modulation, or both the build-up and the modulation, of the braking force or the drive torque, or both the braking force and the drive torque, up to its end is introduced according to the relation $$F = k_1 \times F_{max}$$

with $k_1$=proportionality factor

F=actual longitudinal force between tire and roadway is monitored and that the ABS or TCS control cycle is concluded prematurely according to the relation $$T_{ABS/TCS} = \frac{T0}{(k_1 \times F_{max}) - F}$$

if the product k1×Fmax is bigger than the force (F) measured with wheel force or tire sensors, where T0 is a nominal time and TABS/TCS the exiting time.

9. A method according to claim 8, wherein a time between 60 and 90 ms is foreseen as the nominal amount T0.

10. A method according to claim 8, wherein a time between 70 to 80 ms is foreseen as nominal amount T0.

11. A method according to claim 1 wherein that during the ABS braking maneuver or the TCS propulsion the product (k1×Fmax) resulting from the maximum force (Fmax) and a proportionality factor (k1), into which a period of time $t_{Impulse}$ from the beginning of the change of force due to the build-up or the modulation, or both the build-up and the modulation, of the braking force or the drive torque, or both the braking force and the drive toque, up to its end is introduced according to the relation $$F = k1 \times F\text{max}$$

with k1=proportionality factor

F=actual longitudinal force between tire and roadway is monitored and that a modulation of the brake pressure by a pressure build-up impulse or an added drive torque, or both the pressure build-up impulse and the added drive torque, is introduced into the control system in a nominal time window, if the product k1×Fmax corresponds approximately to the force (F) determined in the wheel force or tire sensors, where the negative acceleration of the wheels and the change of force (F) is detected and the detected variables are evaluated in such a way that the working point is defined again with increasing force (F) and approximately constant acceleration.

12. A method according to claim 11, wherein the maximum force (Fmax) or the acceleration is evaluated by comparison with a threshold value and that an instability is caused if the threshold value is exceeded by increasing brake pressure or an added drive torque, or both the increasing brake pressure and the added drive torque, said instability initiating an adjustment of the working point.

13. A method according to claim 11, wherein the maximum force (Fmax) or the acceleration is evaluated by comparison with a threshold value and that the force (F) detected is approached to the maximum force (Fmax) and a new working point is adjusted if the threshold value is exceeded by increasing the brake pressure by introducing at least one pressure build-up impulse, usually by introducing several pressure build-up impulses or at least the addition of a drive torque, or introducing several pressure build-up impulses and the addition of the drive torque, into the control system.

14. A method according to claim 11, wherein the nominal time window is between 100 and 200 ms.

15. A method according to claim 1 wherein that during the ABS braking maneuver or the TCS propulsion the product (k1×Fmax) resulting from the maximum force (Fmax) and a proportionality factor (k1), into which a period of time $t_{Impulse}$ from the beginning of the change of force by the build-up or the modulation, or both the build-up and the modulation, of the braking force and/or the drive torque up to its end is introduced according to the relation $$F = k1 \times F\text{max}$$

with k1=proportionality factor

F=actual longitudinal force between tire and roadway is monitored and that a change of force is introduced into the control system by building up or modulating, or both building up and modulating, the braking pressure or the drive torque, or both the braking pressure and the drive torque, if the product k1×Fmax is smaller than the force (F) detected with the wheel force or tire sensors, until the measured force (F) is smaller or equal to k2×Fmin with k2>1.

16. A method according to claim 1 for reducing the stopping distance of a motor vehicle with at least two axes and four wheels, wherein the control of a first controlled variable which is based on wheel force or tire sensors, the nominal value of which is based on the frictional connection between tire and roadway and is defined with a second controlled variable.

* * * * *

UNITED STATES PATENT AND TRADEMARK OFFICE
CERTIFICATE OF CORRECTION

PATENT NO. : 6,616,250 B1
DATED : September 9, 2003
INVENTOR(S) : Helmut Fennel and Ivica Batistic It is certified that error appears in the above-identified patent and that said Letters Patent is hereby corrected as shown below:

<u>Title page,</u>
Item [30], Foreign Application Priority Data,
please change "199 08 546" to read -- 199 08 546.3 --, "199 44 091" to read -- 199 44 091.3 --, and "100 06 012" to read -- 100 06 012.9 --.

<u>Column 11,</u>
Line 64, please change "a_brake" to read -- a brake --.

Signed and Sealed this

Tenth Day of February, 2004

JON W. DUDAS
*Acting Director of the United States Patent and Trademark Office*